Patented May 16, 1950

2,507,564

UNITED STATES PATENT OFFICE 2,507,564

PRESERVED BANANAS

Paul R. Foote, Cincinnati, Ohio

No Drawing. Application August 6, 1945,
Serial No. 609,332

6 Claims. (Cl. 99—154)

This invention relates to a new food product in the form of stable and preserved bananas adapted to be used as a flavor or stock in the preparation of pies, custards, sauces, cakes and pastries, ice cream, candy, or as a stewed fruit.

The principal object of the invention has been to provide the process of preserving bananas so that they retain flavor, sweetness and palatability, which is characteristic of them when they are in a ripened condition, without becoming discolored or overripe during storage.

A further object of the invention has been to provide a process of treating bananas which are fully ripened as well as fruit which is in a green or partially ripe condition, in such manner that the unripened fruit, during treatment, will acquire the sweetness, digestibility and palatability of the mature fruit.

A still further objective of the invention has been to provide a process which is applicable at points of origin of the fruit so that the seasonal large supplies of fruit can be picked and preserved for usage throughout the year. The process, from this point of view, is a particularly desirable one because any green fruit reaching the packing house may be treated along with the ripe fruit without the delay incidental to ripening. In this process, moreover, the high starch content, which is characteristic of an unripened banana and which is difficult to digest, is converted into a high sugar content which is characteristic of a ripened banana and which furnishes a tasty, quick energy food.

Briefly, in accordance with this invention, the bananas are first peeled and then are subdivided, macerated or prepared in pureed condition and then the fruit is subjected to a controlled heat treatment in the presence of added sugar. The invention is based upon the discovery that such treatment is effective for stablizing the color and the flavor of the fruit over prolonged periods when it is packed in hermetically sealed containers or cans. This preservative effect upon the color of bananas is paradoxical in view of their pronounced tendency to turn black or brown even in the presence of moderate amounts of heat or air. The heating step moreover is effective for causing the starches in any unripened bananas which may be present to be converted into sugars, whereby such portions of the stock acquire the digestibility and wholesome characteristic banana flavor of fully ripened fruit. This result is obtained when unripened bananas are subjected to treatment not only in the presence of sugar but also in the presence of bananas which are in a fully ripened condition.

In the practice of the present invention, the natural fruit, as it comes from the grower, is peeled and then is macerated, pureed or cut into sections or pieces. This operation is preferably performed after the fruit is heated to about 100° F. The subdivided material is placed in a kettle and sugar is added, in the form of cane sugar, corn sugar, corn syrup, beet sugar or the like. A fully ripened banana contains approximately 20% sugar, and the additional sugar may be introduced, for example, to the extent of approximately 35% by weight of the batch to make the final sugar content of the product approximately 55%.

After the sugar is added the mass is brought to a boil while being stirred or agitated continuously and is allowed to boil for a period of from three to five minutes more or less, depending upon the type of equipment in which the processing is performed. This operation requires care and attention to avoid discoloration of the fruit. It is desirable that the heating step be completed as rapidly as possible and for this purpose a steam-jacketed kettle may be used. Local discoloration or overheating is avoided by constant stirring. In place of a steam-jacketed kettle other apparatus may be employed to facilitate continuous production without requiring treatment of the bananas in large batches.

It is desirable to cool the product as soon as possible after it has been boiled. This operation may be performed in any convenient way, for example, by running water through the kettle jacket. Cooling is continued until the temperature of the mass reaches 100° F. or thereabouts. Certified food color now may be added and banana flavor also may be added, if desirable, the flavor to the extent of approximately one-fortieth of one percent based on the weight of the whole, and the color in quantities sufficient to make the product of a uniform, pleasing appearance. The addition of color is desirable where the stock contains a substantial portion of unripened fruit which is apt to be much lighter than the color of ripened bananas even after processing. The addition of color also enables the appearance of the product to be standardized and made uniform from batch to batch or can to can.

After incorporation of the color and flavor, if any, the pureed product is placed in jars or cans which are hermetically sealed and then subjected to a sterilizing temperature of approximately 190° F. for one-half hour to sterilize against bacteria which may have entered the product following the boil or during packaging.

In the practice of this invention the product may be made entirely from fully ripened bananas or the product may be made from fully ripened bananas, present to the extent of 10% to 15% by weight of the whole, and from fruit in a green or partially ripened condition which is present to the extent of about 85% to 90%. Under ordinary storage conditions of natural bananas, green fruit requires approximately ten days to ripen. However, in accordance with the present treatment, the starches of the green fruit are converted into sugars through activation by the enzymes present in the ripe fruit and by the application of heat sufficient to elevate the temperature of the pureed mixture to not over 145° F. After this treatment, sugar is added to the product and it is brought to a boil, as previously described, then packed.

While the product has more sugar than natural ripe bananas, still it is devoid of unpleasant sweetness, and all of the natural flavor is present, whether it was made of bananas which were fully ripened or whether the stock originally contained some green fruit.

From the commercial point of view the transportation of stems or stalks is avoided and the extensive refrigeration equipment usually required in the transportation of bananas is eliminated. The bananas therefore may be made available to outlying communities without loss in spoilage, and seasonal marketing problems may be avoided.

Having described my invention, I claim:

1. A method of preparing a banana food product comprising peeling and pureeing fresh bananas containing at least ten to fifteen per cent of fully ripened fruit, the balance partially ripened and green fruit, heating the puree to boiling temperature and boiling it for a period not exceeding substantially three to five minutes, thereafter rapidly cooling the stock and subsequently packing it in hermetically sealed containers, then subjecting the packed containers to a temperature of approximately 190° F. for about a half hour, the boiling of the puree being conducted in the presence of added sugar which is sufficient, taking into consideration the natural sugar content of the bananas, to provide a total sugar content in the mass of approximately fifty per cent.

2. A method of preparing a stable wholesome food product from fully ripened, partially ripened and green bananas, which method comprises macerating both partially and fully ripened bananas with one another, elevating the temperature of the macerated bananas to boiling, and boiling for a period of not over three to five minutes with continuous stirring, lowering the temperature rapidly after the boil, packing the product in hermetically sealed containers and sterilizing the product after packing it by subjecting the packed containers to a temperature of not over approximately 190° F. for a period of a half hour, said boiling of the macerated stock being conducted in the presence of added sugar.

3. A method of preparing a banana food product which comprises macerating fully and partially ripened bananas, elevating the temperature to boiling, with constant stirring, boiling for a period of not over approximately three to five minutes and subsequently cooling the boiled product rapidly, the boiling of the product being conducted in the presence of added sugar which is sufficient to increase the total sugar content of the mass to approximately fifty per cent by weight of the whole.

4. A method of making a banana food product which comprises macerating partially and fully ripened bananas in proportion to approximately ten to fifteen per cent fully ripened fruit and eighty-five to ninety per cent green or partially ripened fruit, heating the macerated bananas to a temperature not substantially exceeding 145° F. for a period of time sufficient to convert the starches in the unripened fruit to sugars and to develop the natural banana flavor of the unripened fruit, then, while stirring, elevating the temperature of the whole to boiling for a period of approximately three to five minutes, in the presence of added sugar sufficient to increase the total sugar content to approximately fifty per cent by weight of the whole and rapidly cooling the stock after boiling, then packing the product.

5. A method of preparing a banana food product which comprises treating unripened bananas which are in subdivided condition in the presence of ripe bananas and in the presence of added sugar by raising the temperature of the mixture approximately to boiling for a short period of time, and then packing the product.

6. A method of preparing a banana food product comprising treating a batch of subdivided fresh bananas containing approximately 10% to 15% of fruit in a fully ripened condition and the balance fruit in a partially ripened condition, by adding sugar thereto and by elevating the temperature of the mixture, with constant stirring, approximately to boiling, for a short period of time, and then packing the product.

PAUL R. FOOTE.

REFERENCES CITED

The following references are of record in the file of this patent:

UNITED STATES PATENTS

| Number | Name | Date |
| --- | --- | --- |
| 1,089,215 | Heine | Mar. 3, 1914 |
| 1,099,577 | Stewart | June 9, 1914 |
| 1,138,887 | Plunkett | May 11, 1915 |
| 1,243,964 | Negrete | Oct. 23, 1917 |
| 2,118,391 | Allain et al. | May 24, 1938 |

OTHER REFERENCES

"Home Canning of Fruits and Vegetables," Farmers' Bulletin 1211, pages 3 and 40.